(12) United States Patent
Chen

(10) Patent No.: US 12,416,848 B2
(45) Date of Patent: Sep. 16, 2025

(54) CAMERA DEVICE

(71) Applicant: Chicony Electronics Co., Ltd., New Taipei (TW)

(72) Inventor: Chien-Yueh Chen, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 285 days.

(21) Appl. No.: 18/354,347

(22) Filed: Jul. 18, 2023

(65) Prior Publication Data

US 2024/0231196 A1 Jul. 11, 2024

(30) Foreign Application Priority Data

Jan. 10, 2023 (TW) ................................. 112101107

(51) Int. Cl.
*G03B 17/55* (2021.01)

(52) U.S. Cl.
CPC ..................... *G03B 17/55* (2013.01)

(58) Field of Classification Search
CPC ................ G03B 17/55; G03B 21/16
See application file for complete search history.

(56) References Cited

U.S. PATENT DOCUMENTS

| 9,668,374 B2 * | 5/2017 | Takahashi | H05K 7/20509 |
| 12,282,247 B2 * | 4/2025 | Lin | G03B 15/03 |
| 2011/0229119 A1 * | 9/2011 | Liang | H04M 1/0264 |
| | | | 396/535 |
| 2014/0071500 A1 * | 3/2014 | Kurotsu | H04N 1/00519 |
| | | | 358/474 |
| 2020/0099902 A1 * | 3/2020 | Egawa | H04N 9/3158 |
| 2021/0389651 A1 * | 12/2021 | Matsui | H05K 7/2039 |

FOREIGN PATENT DOCUMENTS

| CN | 111629139 A | 9/2020 | |
| EP | 4290849 A1 * | 12/2023 | ............. H04N 23/45 |
| KR | 20230103594 A * | 7/2023 | ............. H04N 23/54 |

* cited by examiner

*Primary Examiner* — Stephanie E Bloss
*Assistant Examiner* — Diana Hancock
(74) *Attorney, Agent, or Firm* — MUNCY, GEISSLER, OLDS & LOWE, P.C.

(57) ABSTRACT

A camera device includes a housing, an image-capturing module, a front thermal-conductive element, and two thermal-conductive assembling elements. The housing includes a rear cover. The image-capturing module includes a circuit board, and the circuit board divides the housing into a front space and a rear space. A heating element is on the front surface, and two assembling holes are respectively at two opposite sides of the circuit board. The front thermal-conductive element is in the front space and contacts the heating element. The two thermal-conductive assembling elements are respectively assembled with the two assembling holes of the circuit board. Each of the thermal-conductive assembling elements has a first end and a second end, the first end is in the front space and contacts the front thermal-conductive element, and the second end is in the rear space and contacts the rear cover.

17 Claims, 9 Drawing Sheets

CAMERA DEVICE

CROSS-REFERENCE TO RELATED APPLICATION

This non-provisional application claims priority under 35 U.S.C. § 119(a) to Patent Application No. 112101107 filed in Taiwan, R.O.C. on Jan. 10, 2023, the entire contents of which are hereby incorporated by reference.

BACKGROUND

Technical Field

The instant disclosure relates to an optical device, in particular, to a camera device.

Related Art

Along with developments of technology, camera devices are widely used in different fields, such as personal electronic products, automobiles, and medical sciences. For example, a camera device may be installed on the car to capture the image outside the car for driving assistance. Alternatively, a camera device may be installed on a personal computer to support the functions of video recording, on-line meeting, facial recognition or the like.

SUMMARY

In general, a camera module is provided in the housing of a camera device known to the inventor. For example, the camera module includes a circuit board and a camera lens and other electronic components which are disposed on the circuit board. However, during the operation of the camera device, the camera lens and these electronic components are also in operation, and thus heats are generated. As a result, the circuit board may be heated and deformed easily, and the clarity of the image captured by the camera lens is thus affected.

In view of this, in one embodiment, a camera device is provided. The camera device comprises a housing, an image-capturing module, a front thermal-conductive element, and two thermal-conductive assembling elements. The housing comprises a front cover and a rear cover, the front cover is assembled with the rear cover, and the front cover has a light-transmitting portion. The image-capturing module comprises a circuit board and a camera module, the circuit board is in the housing and divides the housing into a front space and a rear space, the circuit board has a front surface and two assembling holes, a heating element is on the front surface, the two assembling holes are respectively at two opposite sides of the circuit board, and the camera module is on the front surface and corresponds to the light-transmitting portion. The front thermal-conductive element is in the front space and contacts the heating element. The two thermal-conductive assembling elements are respectively assembled with the two assembling holes of the circuit board, each of the thermal-conductive assembling elements has a first end and a second end opposite to the first end, the first end is in the front space and contacts the front thermal-conductive element, and the second end is in the rear space and contacts the rear cover.

As above, according to the camera device of one or some embodiments of the instant disclosure, the two thermal-conductive assembling elements are assembled with the circuit board, and the first end and the second end of each of the thermal-conductive assembling elements contact the front thermal-conductive element and the rear cover, respectively. Therefore, the heat generated during the operation of the image-capturing module can be transmitted to the rear cover through the front thermal-conductive element and the thermal-conductive assembling elements. Hence, a great heat dissipation performance can be achieved so as to greatly reduce the deformation amount of the circuit board upon the circuit board is heated, thus maintaining the clarity of the image captured by the camera module.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiments are provided for facilitating the descriptions of the instant disclosure. However, the embodiments are provided as examples for illustrative purpose, but not a limitation to the instant disclosure. In all the figures, same reference numbers designate identical or similar elements.

Figure 1:
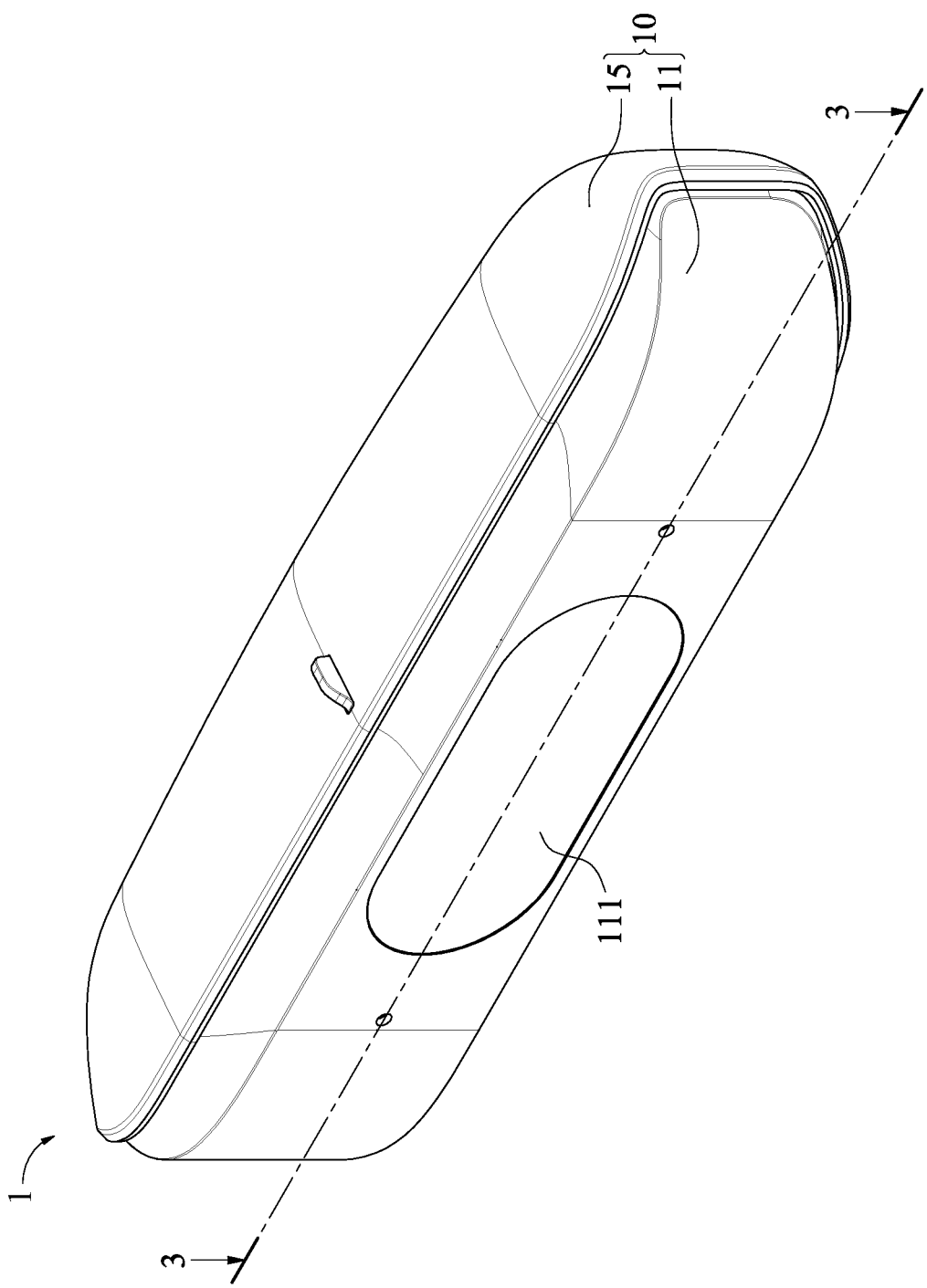
FIG. 1 illustrates a perspective view of a camera device according to an exemplary embodiment of the instant disclosure.
Figure 2:
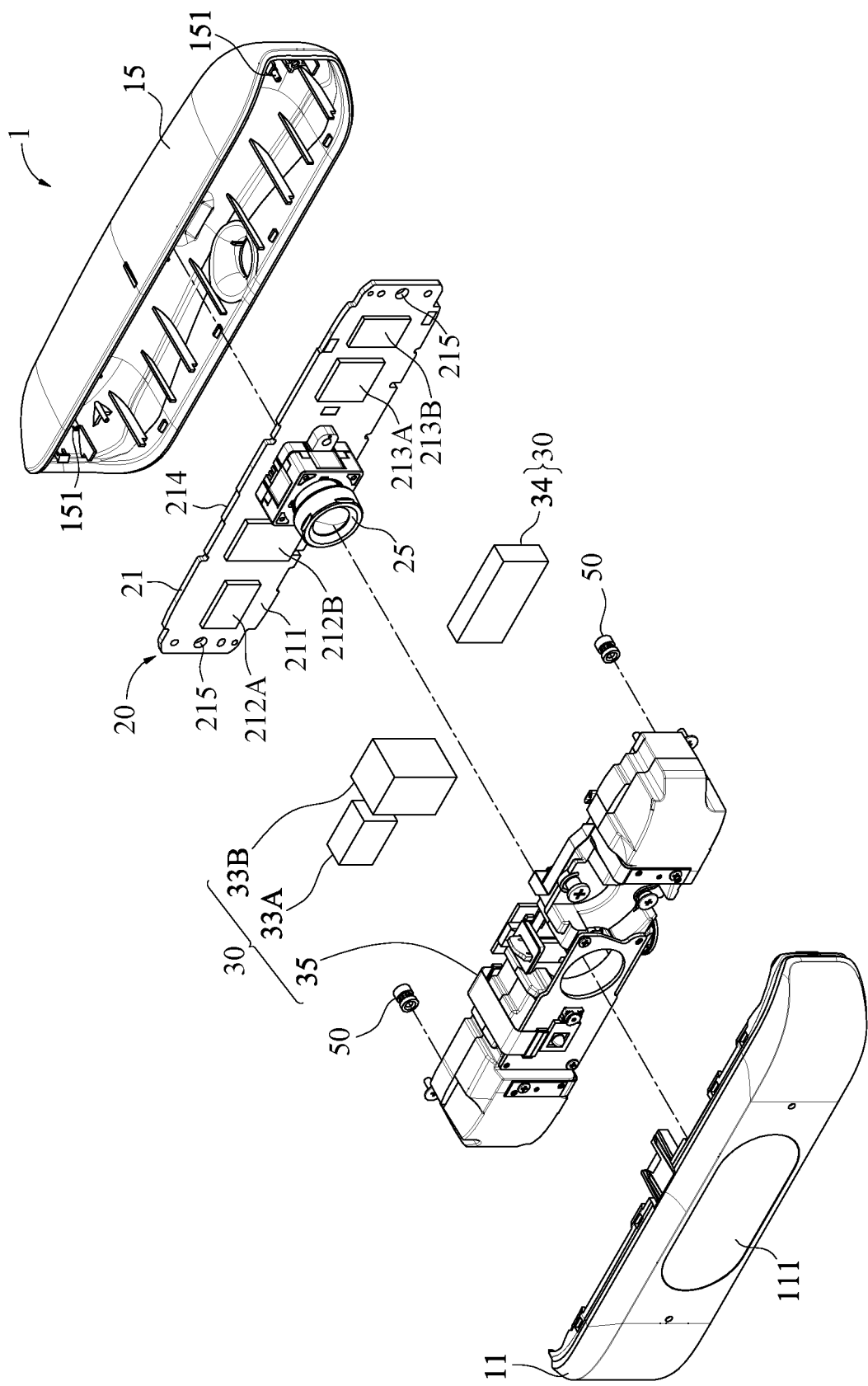
FIG. 2 illustrates an exploded view of a camera device according to an exemplary embodiment of the instant disclosure.
Figure 3:
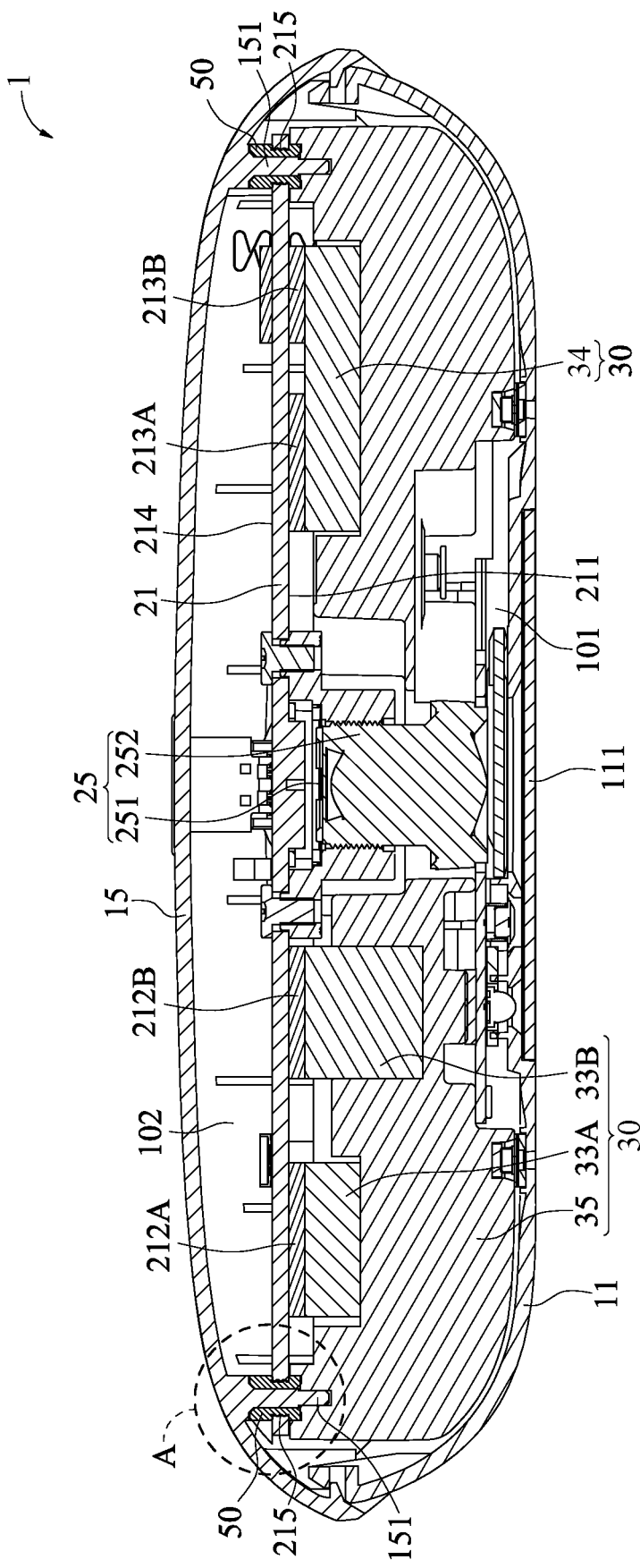
FIG. 3 illustrates a cross-sectional view along the line 3-3 shown in FIG. 1.

FIG. 1 illustrates a perspective view of a camera device according to an exemplary embodiment of the instant disclosure. FIG. 2 illustrates an exploded view of a camera device according to an exemplary embodiment of the instant disclosure. FIG. 3 illustrates a cross-sectional view along the line 3-3 shown in FIG. 1. As shown in FIG. 1 to FIG. 3, in this embodiment, the camera device 1 comprises a housing 10, an image-capturing module 20, a front thermal-conductive element 30, and at least two thermal-conductive assembling elements 50. In some embodiments, the camera device 1 may be utilized in different electronic devices for capturing images around the electronic devices. For example, the camera device 1 may be utilized in automotive products (e.g., dashcams, backup camera systems, or surrounding view systems), mobile devices (e.g., smart phones, tablet computers, or notebook computers), cameras, or other electronic devices.

As shown in FIG. 1 to FIG. 3, the housing 10 comprises a front cover 11 and a rear cover 15, and the front cover 11 is assembled with the rear cover 15. For example, the front cover 11 and the rear cover 15 may be assembled with each other by adhering, engaging, hot-melting, locking, or the like to form the hollow housing 10.

As shown in FIG. 2 and FIG. 3, the image-capturing module 20 comprises a circuit board 21 and a camera module 25. The circuit board 21 is in the housing 10, the circuit board 21 divides the housing 10 into a front space 101 and a rear space 102, and the front space 101 is closer to the front cover 11 with respect to the rear space 102 (in other words, in this embodiment, the distance between the front space 101 and the front cover 11 is less than the distance between the rear space 102 and the front cover 11).

As shown in FIG. 2 and FIG. 3, the circuit board 21 has a front surface 211, a rear surface 214, and two assembling holes 215. The front surface 211 and the rear surface 214 are two opposite surfaces of the circuit board 21. The front surface 211 faces the front cover 11, the rear surface 214 faces the rear cover 15, and the front surface 211 is closer to the front cover 11 with respect to the rear surface 214 (in other words, in this embodiment, the distance between the front surface 211 and the front cover 11 is less than the distance between the rear surface 214 and the front cover 11). The two assembling holes 215 are at two opposite sides of the circuit board 21, each of the assembling holes 215 defines through the front surface 211 and the rear surface 214 of the circuit board 21, so that each of the thermal-conductive assembling elements 50 can be assembled in a corresponding one of the assembling holes 215. The number of the assembling holes 215 and the number of the thermal-conductive assembling elements 50 can be adjusted according to product demands. For example, the number of the assembling holes 215 and the number of the thermal-conductive assembling elements 50 may be three or more.

As shown in FIG. 2 and FIG. 3, the camera module 25 is on the front surface 211 of the circuit board 21 and in the front space 101, the front cover 11 of the housing 10 has a light-transmitting portion 111, and the position of the camera module 25 corresponds to the position of the light-transmitting portion 111. For example, the light-transmitting portion 111 may be a transparent cover (as shown in FIG. 3) or a through hole, so that the external light can enter the camera device 1 through the light-transmitting portion 111, and the camera module 25 can sense and obtain the image.

As shown in FIG. 2 and FIG. 3, in this embodiment, the camera module 25 comprises an optical sensing element 251 and a lens 252, the optical sensing element 251 is on the front surface 211 of the circuit board 21, and the lens 252 is between the optical sensing element 251 and the light-transmitting portion 111. The optical sensing element 251 may be a charge-coupled device (CCD), a complementary metal-oxide semiconductor (CMOS), or a CMOS active pixel sensor, for receiving external light to sense and obtain the image.

As shown in FIG. 2 and FIG. 3, at least one heating element (such as a microprocessor, a memory, a resistor, a capacitor, or other electronic components) is on the front surface 211 of the circuit board 21. In this embodiment, the number of the heating element is plural, the heating elements comprise a plurality of first heating elements 212A, 212B and a plurality of second heating elements 213A, 213B respectively at two opposite sides of the camera module 25.

As shown in FIG. 2 and FIG. 3, the front thermal-conductive element 30 is in the front space 101 and contacts the first heating elements 212A, 212B and the second heating elements 213A, 213B. Therefore, the heat generated during the operation of the first heating elements 212A, 212B and the second heating elements 213A, 213B can be transmitted to the front thermal-conductive element 30.

In some embodiments, the front thermal-conductive element 30 may be made of a material with high thermal conductivity so as to provide proper thermal conductive performance, and the front thermal-conductive element 30 may be a single element or may be assembled by several parts. For example, the front thermal-conductive element 30 may be a metal member (for example a plate or a block made of iron, aluminum, steel or other metal materials). Alternatively, in some embodiments, the front thermal-conductive element 30 may be an elastic member with high thermal conductivity and elasticity; for example, the front thermal-conductive element 30 may be an elastic member made of an elastic material (for example, silicone rubber) with high thermal conductivity (for example, greater than 1 W/mK). Alternatively, in some other embodiments, the front thermal-conductive element 30 may be the assembly of at least one metal member and at least one elastic member, depending on the actual product demands.

As shown in FIG. 2 and FIG. 3, in this embodiment, the front thermal-conductive element 30 comprises a plurality of elastic thermal-conductive members and an inelastic thermal-conductive member, and the elastic thermal-conductive members comprises a plurality of first elastic thermal-conductive member 33A, 33B and a second elastic thermal-conductive member 34. The first elastic thermal-conductive members 33A, 33B and the second elastic thermal-conductive member 34 may be made of an elastic material with high thermal conductivity (for example, the aforementioned silicone rubber) and thus have both the elasticity and the high thermal conductivity property. The inelastic thermal-conductive member 35 may be made of a metal material with high thermal conductivity. The first elastic thermal-conductive members 33A, 33B and the second elastic thermal-conductive member 34 are between the inelastic thermal-conductive member 35 and the circuit board 21, and the inelastic thermal-conductive member 35 further extends toward the assembling holes 215 of the circuit board 21.

As shown in FIG. 2 and FIG. 3, in this embodiment, one of two sides of each of the first elastic thermal-conductive members 33A, 33B contacts a corresponding one of the first heating elements 212A, 212B, respectively, and the other sides of the first elastic thermal-conductive members 33A, 33B contact the inelastic thermal-conductive member 35. One of two sides of the second elastic thermal-conductive member 34 contacts the second heating elements 213A, 213B, and the other side of the second elastic thermal-conductive member 34 contacts the inelastic thermal-conductive member 35. Therefore, the heat generated during the operation of the first heating elements 212A, 212B and the second heating elements 213A, 213B can be transmitted to the inelastic thermal-conductive member 35 through the first elastic thermal-conductive members 33A, 33B and the second elastic thermal-conductive member 34. Moreover, when the first elastic thermal-conductive members 33A, 33B, the second elastic thermal-conductive member 34, or the inelastic thermal-conductive member 35 have slight offsets due to assembling tolerance or heat, because of the elasticity property, the first elastic thermal-conductive members 33A, 33B and the second elastic thermal-conductive member 34 can keep contacting the first heating elements 212A, 212B, the second heating elements 213A, 213B, and the inelastic thermal-conductive member 35, so that a proper thermal conduction performance can be maintained.

As shown in FIG. 2 and FIG. 3, the contact area between the front thermal-conductive element 30 and each of the first heating elements 212A, 212B may be the same as the contact area between the front thermal-conductive element 30 and each of the second heating elements 213A, 213B. For example, in this embodiment, a first contact area is between the first elastic thermal-conductive members 33A, 33B of the front thermal-conductive element 30 and the first heating elements 212A, 212B, a second contact area is between the second elastic thermal-conductive member 34 and the second heating elements 213A, 213B, and the first contact area is equal to the second contact area. Therefore, forces can be applied to the two sides of the circuit board 21 uniformly to prevent the tilting or deformation of the circuit board 21.

Figure 4:
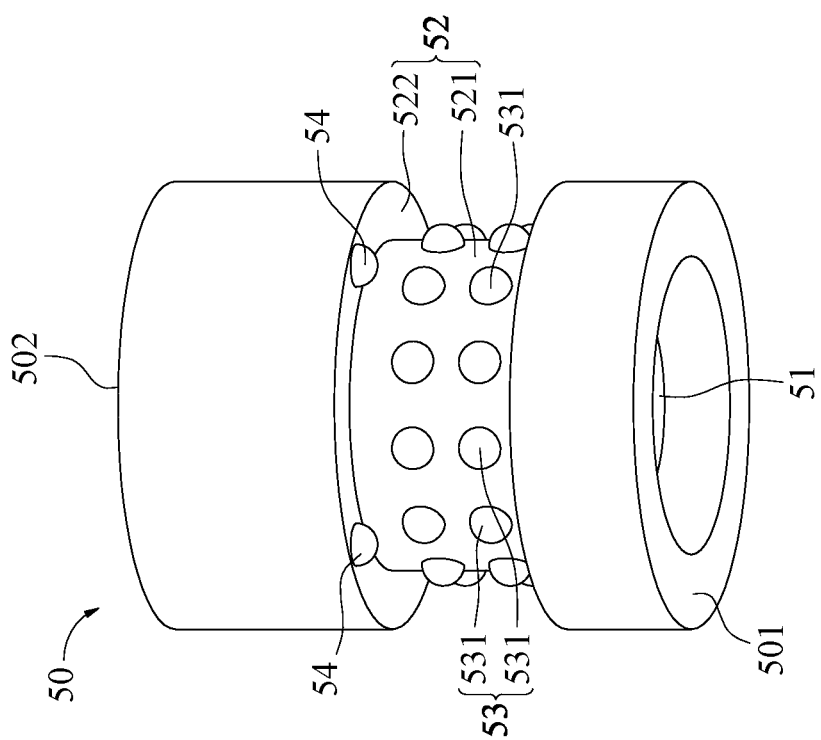
FIG. 4 illustrates a perspective view of a thermal-conductive assembling element according to an exemplary embodiment of the instant disclosure.
Figure 5:
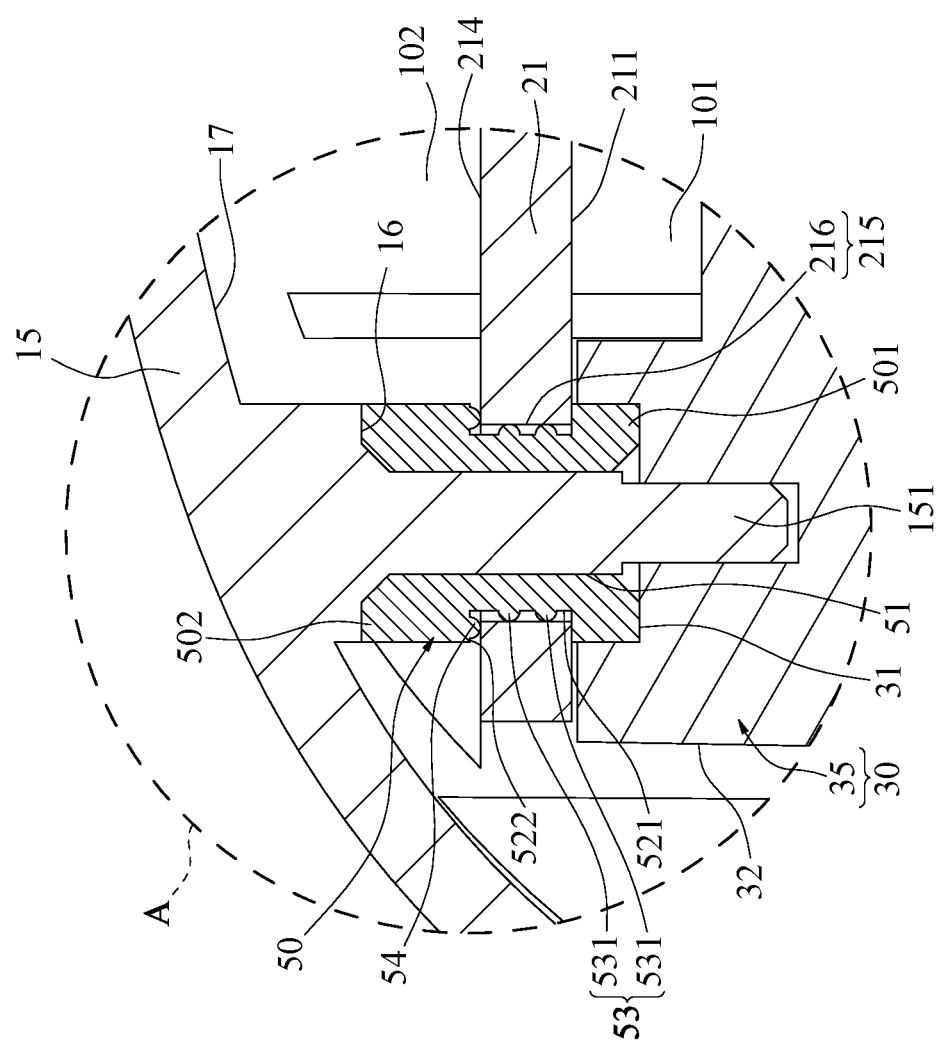
FIG. 5 illustrates an enlarged partial view of the A region shown in FIG. 3.

FIG. 4 illustrates a perspective view of a thermal-conductive assembling element according to an exemplary embodiment of the instant disclosure. FIG. 5 illustrates an enlarged partial view of the A region shown in FIG. 3. As shown in FIG. 2 to FIG. 5, the two thermal-conductive assembling elements 50 are respectively assembled with the two assembling holes 215 of the circuit board 21. Each of the thermal-conductive assembling elements 50 has a first end 501 and a second end 502 opposite to the first end 501, and the first end 501 is in the front space 101 and contacts the front thermal-conductive element 30 (for example, in this embodiment, the first end 501 contacts the inelastic thermal-conductive member 35 of the front thermal-conductive element 30), and the second end 502 is in the rear space 102 and contacts the rear cover 15.

In other words, in this embodiment, each of the thermal-conductive assembling elements 50 passes through a corresponding one of the assembling holes 215 of the circuit board 21, and two opposite ends of each of the thermal-conductive assembling elements 50 respectively contact the front thermal-conductive element 30 and the rear cover 15. Accordingly, the heat generated during the operation of the heating element(s) (such as the first heating elements 212A, 212B and the second heating elements 213A, 213B) of the image-capturing module 20 can be transmitted backward to the rear cover 15 through the front thermal-conductive element 30 and the thermal-conductive assembling elements 50, and then the heat dissipation performance can be achieved because the rear cover 15 is exposed to the ambient atmosphere. Moreover, it is understood that, upon using the camera device 1, the front cover 11 faces the user and thus will be touched easily. Therefore, according to one or some embodiments of the instant disclosure, the heat is transmitted backward to the rear cover 15 through the thermal-conductive assembling elements 50, and the amount of the heat transmitted to the front cover 11 can be reduced, so that the user can be prevented from touching the high temperature front cover 11.

Moreover, because the heat dissipation performance of the camera device 1 greatly increases, the amount of deformation of the circuit board 21 upon being heated can be greatly reduced. Therefore, the position of the camera module 25 on the circuit board 21 can be prevented from being overly shifted and thus the clarity of the image captured by the camera module 25 can be maintained. In some embodiments, the thermal conductivity of the rear cover 15 may be greater than the thermal conductivity of the front cover 11; for example, the rear cover 15 is a metal cover and the front cover 11 is a plastic cover. Therefore, the heat can be transmitted to the rear cover 15 much more rapidly, and the amount of the heat transmitted to the front cover 11 can be reduced to prevent the front cover 11 from having an excessive temperature.

As shown in FIG. 1 to FIG. 3, each of the thermal-conductive assembling elements 50 may be an elastic element. For example, each of the thermal-conductive assembling elements 50 may be made of an elastic material with high thermal conductivity (for example, the aforementioned silicone rubber) and thus have both the elasticity and the high thermal conductivity property. Moreover, when the front thermal-conductive element 30 or the rear cover 15 have slight offsets due to assembling tolerance or heat, because of the elasticity property, the thermal-conductive assembling elements 50 can keep contacting the front thermal-conductive element 50 and the rear cover 15, so that a proper thermal conduction performance can be maintained.

As shown in FIG. 3 to FIG. 5, in this embodiment, each of the thermal-conductive assembling elements 50 is a hollow cylindrical member and has a through hole 51. The through hole 51 defines through the first end 501 and the second end 502 of each of the thermal-conductive assembling elements 50. The rear cover 15 of the housing 10 has two thermal-conductive posts 1151, and each of the thermal-conductive posts 151 passes through the through hole 51 of a corresponding one of the thermal-conductive assembling elements 50 and contacts the front thermal-conductive element 30. Accordingly, the rear cover 15 can contact the thermal-conductive assembling elements 50 and the front thermal-conductive element 30 at the same time, so that the heat generated during the operation of the heating element(s) of the image-capturing module 20 can be transmitted to the rear cover 15 much more rapidly, thereby further increasing the heat dissipation performance.

As shown in FIG. 3 to FIG. 5, the front thermal-conductive element 30 has two first contact surfaces 31 and a first noncontact surface 32. Each of the first contact surfaces 31 is a surface of a portion of the front thermal-conductive element 30 contacting the first end 501 of a corresponding one of the thermal-conductive assembling elements 50, and the first noncontact surface 32 is a surface of rest portions of the front thermal-conductive element 30 not contacting the thermal-conductive assembling element 50. Moreover, each of the first contact surfaces 31 may be applied with surface treatment to further increase the flatness of the surface. For example, the surface treatment may be polishing, grinding, sandblasting or the like. Hence, the surface roughness of each of the first contact surfaces 31 is less than the surface roughness of the first noncontact surface 32, thereby reducing the heat resistance between the front thermal-conductive element 30 and each of the thermal-conductive assembling elements 50 and thus increasing the thermal conduction performance.

As shown in FIG. 3 to FIG. 5, likewise, the rear cover 15 has two second contact surfaces 16 and a second noncontact surface 17. Each of the second contact surfaces 16 is a surface of a portion of the rear cover 15 contacting the second end 502 of a corresponding one of the thermal-conductive assembling elements 50, and the second noncontact surface 17 is a surface of rest portions of the rear cover 15 not contacting the thermal-conductive assembling element 50. Moreover, each of the second contact surfaces 16 may be applied with surface treatment to further increase the flatness of the surface. Hence, the surface roughness of each of the second contact surfaces 16 is less than the surface roughness of the second noncontact surface 17, thereby reducing the heat resistance between the rear cover 15 and each of the thermal-conductive assembling elements 50 and thus increasing the thermal conduction performance.

As shown in FIG. 4 and FIG. 5, in this embodiment, each of the thermal-conductive assembling elements 50 has a ring-shaped recess 52, and a first hole edge portion 216 of each of the assembling holes 215 of the circuit board 21 is in the ring-shaped recess 52 of a corresponding one of the thermal-conductive assembling elements 50. Therefore, the thermal-conductive assembling elements 50 can further limit the movement of the circuit board 21.

As shown in FIG. 4 and FIG. 5, in this embodiment, the ring-shaped recess 52 of each of the thermal-conductive assembling elements 50 has a ring-shaped bottom wall 521, a ring-shaped member 53 protrudes from the ring-shaped bottom wall 521, and the ring-shaped member 53 contacts the first hole edge portion 216 of the circuit board 21. In other words, in this embodiment, the thermal-conductive assembling elements 50 contact the circuit board 21 through the ring-shaped members 53, and the contact between each of the thermal-conductive assembling elements 50 and a corresponding one of the first hole edge portions 216 of the circuit board 21 is in a point-contact manner or a line-contact manner, rather than a surface-contact manner. Hence, the heat resistance between each of the thermal-conductive assembling elements 50 and the circuit board 21 can be increased and the amount of heat transmitted to the circuit board 21 can be reduced, thereby further reducing the amount of deformation of the circuit board 21 upon being heated. Therefore, the position of the camera module 25 on the circuit board 21 can be prevented from being overly shifted and thus the clarity of the image captured by the camera module 25 can be maintained.

Furthermore, as shown in FIG. 4 and FIG. 5, in this embodiment, the ring-shaped member 53 of each of the thermal-conductive assembling elements 50 is a plurality of protruding spots 531 arranged annularly around the ring-shaped bottom wall 521. Therefore, the contact between each of the thermal-conductive assembling elements 50 and the circuit board 21 is in a point-contact manner. Hence, the heat resistance between each of the thermal-conductive assembling elements 50 and the circuit board 21 can be increased and the amount of heat transmitted to the circuit board 21 can be reduced. In some embodiments, the ring-shaped member 53 may be a ring-shaped structure, and the instant disclosure is not limited thereto.

As shown in FIG. 4 and FIG. 5, the ring-shaped recess 52 of each of the thermal-conductive assembling elements 50 has a ring-shaped side wall 522. The ring-shaped side wall 522 is connected to the ring-shaped bottom wall 521, a plurality of protrusions 522 is on ring-shaped side wall 522, and the protrusions 54 contact at least one surface of the circuit board 21. For example, in this embodiment, the protrusions 54 contact the rear surface 214 of the circuit board 21. Therefore, the contact between the ring-shaped side wall 522 of the ring-shaped recess 52 and the circuit board 21 is in a point-contact manner. Hence, the heat resistance between each of the thermal-conductive assembling elements 50 and the circuit board 21 can be increased and the amount of heat transmitted to the circuit board 21 can be reduced.

Figure 6:
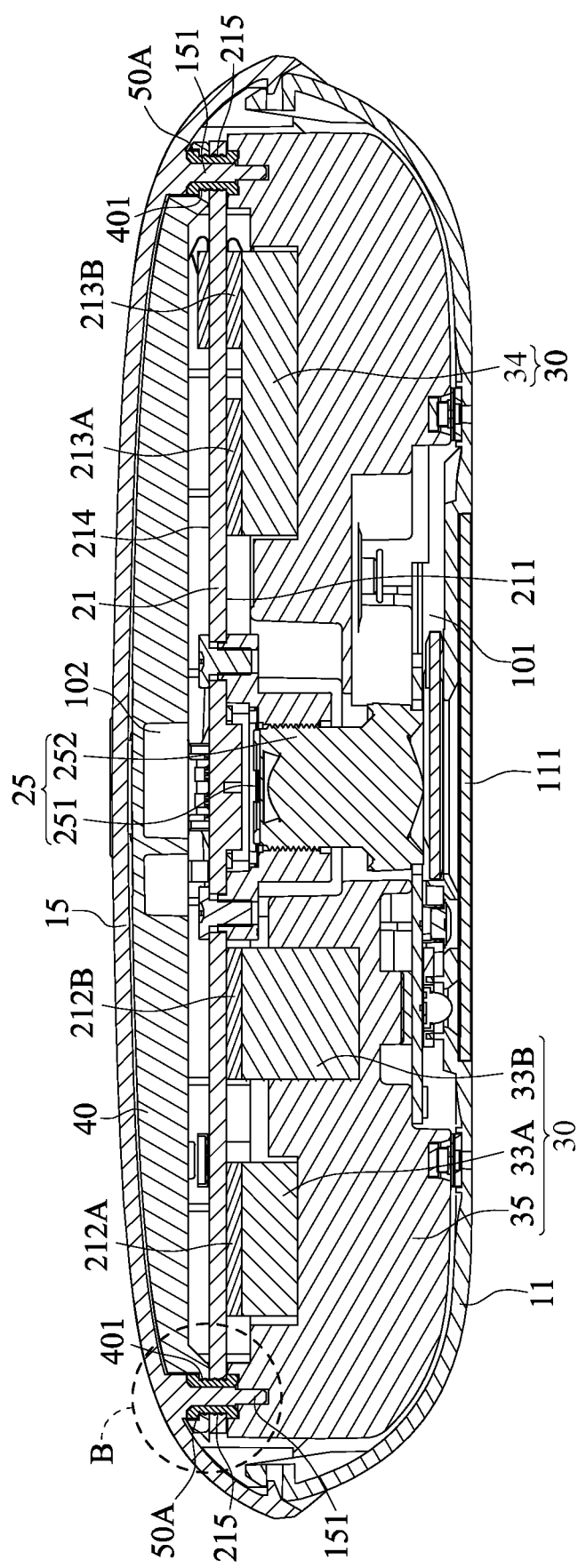
FIG. 6 illustrates a cross-sectional view of a camera device according to another exemplary embodiment of the instant disclosure.
Figure 7:
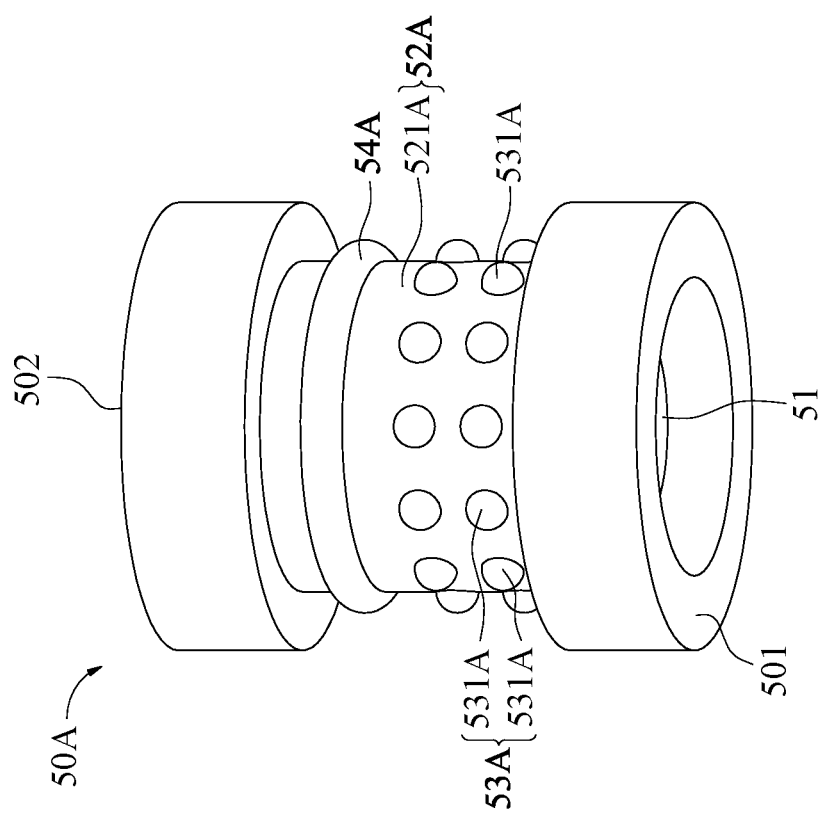
FIG. 7 illustrates a perspective view of a thermal-conductive assembling element according to another exemplary embodiment of the instant disclosure.
Figure 8:
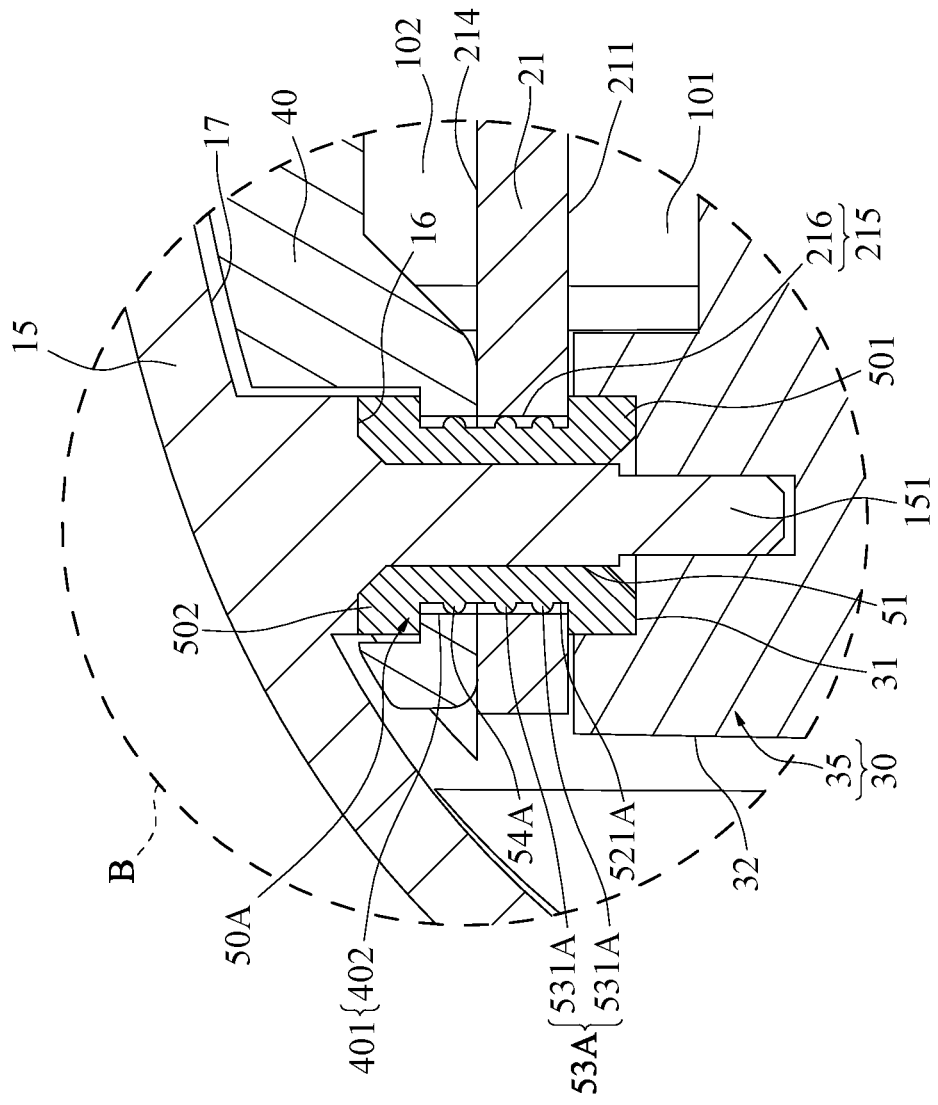
FIG. 8 illustrates an enlarged partial view of the B region shown in FIG. 6.

FIG. 6 illustrates a cross-sectional view of a camera device according to another exemplary embodiment of the instant disclosure. FIG. 7 illustrates a perspective view of a thermal-conductive assembling element according to another exemplary embodiment of the instant disclosure. FIG. 8 illustrates an enlarged partial view of the B region shown in FIG. 6. As shown in FIG. 6 to FIG. 8, the difference between this embodiment and the embodiment shown in FIG. 3 to FIG. 5 is at least that, in this embodiment, a rear thermal-conductive element 40 is further in the rear space 102 of the housing 10. The rear thermal-conductive element 40 may be made of a material with high thermal conductivity so as to provide proper thermal conductive performance. For example, the rear thermal-conductive element 40 may be a metal member (for example a plate or a block made of iron, aluminum, steel or other metal materials). Alternatively, in some embodiments, the rear thermal-conductive element 40 may be an elastic member with high thermal conductivity and elasticity; for example, the rear thermal-conductive element 40 may be an elastic member made of an elastic material (for example, silicone rubber) with high thermal conductivity (for example, greater than 1 W/mK). Alternatively, in some other embodiments, the rear thermal-conductive element 40 may be the assembly of at least one metal member and at least one elastic member, depending on the actual product demands.

As shown in FIG. 6 to FIG. 8, the rear thermal-conductive element 40 has two penetration holes 401, positions of the two penetration holes 401 correspond to positions of the two assembling holes 215. Each of the thermal-conductive assembling elements 50A is assembled with a corresponding one of the penetration holes 401 and a corresponding one of the assembling holes 215, so that each of the thermal-conductive assembling elements 50A can contact the front thermal-conductive element 30, the rear cover 15, and the rear thermal-conductive element 40. Therefore, not only the heat generated during the operation of the heating element(s) of the image-capturing module 20 can be transmitted to the rear cover 15 through the front thermal-conductive element 30 and each of the thermal-conductive assembling elements 50A, but also the thermal-conductive assembling elements 50A can further transmit the heat to the rear thermal-conductive element 40, thereby further increasing the heat dissipation performance.

As shown in FIG. 6 to FIG. 8, in this embodiment, each of the thermal-conductive assembling elements 50A has a ring-shaped recess 52A, a first hole edge portion 216 of each of the assembling holes 215 of the circuit board and a second hole edge portion 402 of each of the penetration holes 401 of the rear thermal-conductive element 40 are in the ring-shaped recess 42A of a corresponding one of the thermal-conductive assembling element 50A. Therefore, the thermal-conductive assembling elements 50A can limit the movements of the circuit board 21 and the rear thermal-conductive element 40.

Furthermore, as shown in FIG. 6 to FIG. 8, in this embodiment, the ring-shaped recess 52A of each of the thermal-conductive assembling elements 50A has a ring-shaped bottom wall 521A, a first ring-shaped member 53A and a second ring-shaped member 54A protrude from the ring-shaped bottom wall 521A, the first ring-shaped member 53A of each of the thermal-conductive assembling elements 50A contacts the first hole edge portion 216 of a corresponding one of the assembling holes 215, and the second ring-shaped member 54A of each of the thermal-conductive assembling elements 50A contacts the second hole edge portion 402 of a corresponding one of the penetration holes 401. Therefore, the contact between each of the thermal-conductive assembling elements 50A and the circuit board 21 and the contact between each of the thermal-conductive assembling elements 50A and the rear thermal-conductive element 40 are in a point-contact manner or a line-contact manner, rather than a surface-contact manner. Hence, the heat resistance between each of the thermal-conductive assembling elements 50A and the circuit board 21 and the heat resistance between each of the thermal-conductive assembling elements 50A and the rear thermal-conductive element 40 can be increased, and the amount of heat transmitted to the circuit board 21 and the rea thermal-conductive element 40 can be reduced. Consequently, the heat can be transmitted backward to the rear cover 15 as much as possible.

As shown in FIG. 6 to FIG. 8, in this embodiment, the first ring-shaped member 53A is a plurality of protruding spots 531A arranged annularly, and the second ring-shaped member 54A is a ring structure. Therefore, the contact between each of the thermal-conductive assembling elements 50A and the circuit board 21 is in a point-contact manner to have the largest heat resistance, the contact between each of the thermal-conductive assembling elements 50A and the rear thermal-conductive element 40 is in a line-contact manner to have a middle heat resistance, and the contact between each of the thermal-conductive assembling elements 50A, the front thermal-conductive element 30, and the rear cover 15 is in a surface-contact manner to have a smallest heat resistance. Hence, when the image-capturing module 20 is in operation to generate heat, the amount of the heat transmitted to the circuit board 21 is smallest and the amount of the heat transmitted backward to the rear cover 15 is largest, thereby reducing the amount of deformation of the circuit board 21 upon being heated so as to have a better heat dissipation performance.

Figure 9:
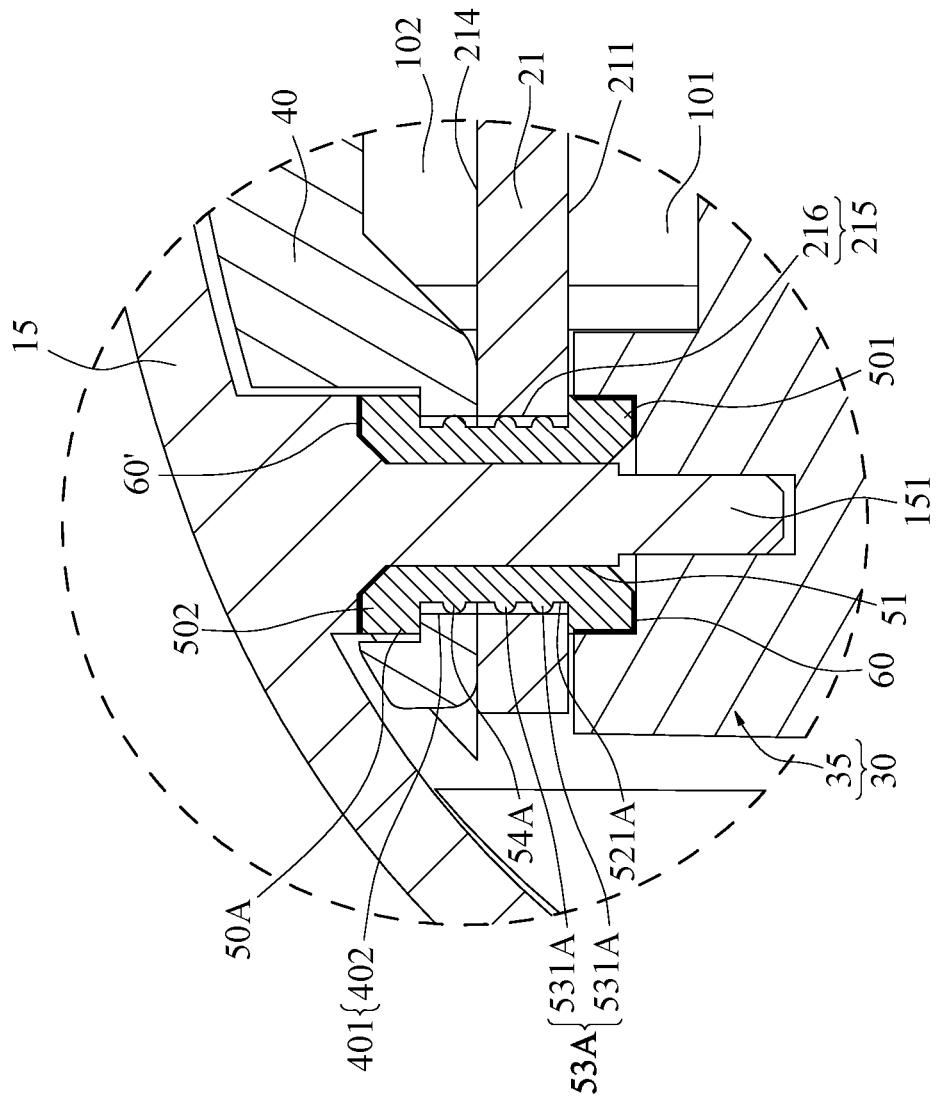
FIG. 9 illustrates a partial cross-sectional view of a camera device according to another exemplary embodiment of the instant disclosure.

FIG. 9 illustrates a partial cross-sectional view of a camera device according to another exemplary embodiment of the instant disclosure. As shown in FIG. 9, a thermal-conductive layer 60 is between the first end 501 of each of the thermal-conductive assembling elements 50A and the front thermal-conductive element 30, and another thermal-conductive layer 60' is between the second end 502 of each of the thermal-conductive assembling elements 50A and the rear cover 15; for example, the thermal-conductive layers 60, 60' may be metal electroplating layers, thermal-conductive adhesives, or thermal-conductive pastes, thereby further increasing the thermal conduction performance between each of the thermal-conductive assembling elements 50A, the front thermal-conductive element 30, and the rear cover 15.

As above, according to the camera device of one or some embodiments of the instant disclosure, the two thermal-conductive assembling elements are assembled with the circuit board, and the first end and the second end of each of the thermal-conductive assembling elements contact the front thermal-conductive element and the rear cover, respectively. Therefore, the heat generated during the operation of the image-capturing module can be transmitted to the rear cover through the front thermal-conductive element and the thermal-conductive assembling elements. Hence, a great heat dissipation performance can be achieved so as to greatly reduce the deformation amount of the circuit board upon the circuit board is heated, thus maintaining the clarity of the image captured by the camera module.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A camera device comprising:
   a housing comprising a front cover and a rear cover, wherein the front cover is assembled with the rear cover, and the front cover has a light-transmitting portion;
   an image-capturing module comprising a circuit board and a camera module, wherein the circuit board is in the housing and divides the housing into a front space and a rear space, the circuit board has a front surface and two assembling holes, at least one heating element is on the front surface, the two assembling holes are respectively at two opposite sides of the circuit board, the camera module is on the front surface and corresponds to the light-transmitting portion;
   a front thermal-conductive element in the front space and contacting the at least one heating element; and
   two thermal-conductive assembling elements respectively assembled with the two assembling holes of the circuit board, wherein each of the thermal-conductive assembling elements has a first end and a second end opposite to the first end, the first end is in the front space and contacts the front thermal-conductive element, and the second end is in the rear space and contacts the rear cover.

2. The camera device according to claim 1, wherein each of the thermal-conductive assembling elements is an elastic element.

3. The camera device according to claim 1, wherein each of the thermal-conductive assembling elements is a hollow cylindrical member and has a through hole, the rear cover has two thermal-conductive posts, and each of the thermal-conductive posts passes through the through hole of a corresponding one of the thermal-conductive assembling elements and contacts the front thermal-conductive element.

4. The camera device according to claim 1, wherein each of the thermal-conductive assembling elements has a ring-shaped recess, and a hole edge portion of each of the assembling holes of the circuit board is in the ring-shaped recess of a corresponding one of the thermal-conductive assembling elements.

5. The camera device according to claim 4, wherein the ring-shaped recess has a ring-shaped bottom wall, a ring-shaped member protrudes from the ring-shaped bottom wall, and the ring-shaped member contacts the hole edge portion.

6. The camera device according to claim 5, wherein the ring-shaped member is a plurality of protruding spots arranged annularly.

7. The camera device according to claim 5, wherein the ring-shaped recess has a ring-shaped side wall, the ring-shaped side wall is connected to the ring-shaped bottom wall, a plurality of protrusions is on the ring-shaped side wall, and the protrusions contact a surface of the circuit board.

8. The camera device according to claim 1, wherein a rear thermal-conductive element is further in the rear space, the rear thermal-conductive element has two penetration holes, positions of the two penetration holes correspond to positions of the two assembling holes, and the two thermal-conductive assembling elements are further assembled with the two penetration holes.

9. The camera device according to claim 8, wherein each of the thermal-conductive assembling elements has a ring-shaped recess, a first hole edge portion of each of the assembling holes of the circuit board and a second hole edge portion of each of the penetration holes are in the ring-shaped recess of a corresponding one of the thermal-conductive assembling elements.

10. The camera device according to claim 9, wherein the ring-shaped recess has a ring-shaped bottom wall, a first ring-shaped member and a second ring-shaped member protrude from the ring-shaped bottom wall, the first ring-shaped member contacts the first hole edge portion, and the second ring-shaped member contacts the second hole edge portion.

11. The camera device according to claim 10, wherein the first ring-shaped member is a plurality of protruding spots arranged annularly, and the second ring-shaped member is a ring structure.

12. The camera device according to claim 1, wherein the front thermal-conductive element has two first contact surfaces and a first noncontact surface, each of the first contact surfaces contacts the first end of the corresponding one of the thermal-conductive assembling elements, the first noncontact surface does not contact each of the thermal-conductive assembling elements, and a surface roughness of each of the first contact surfaces is less than a surface roughness of the first noncontact surface.

13. The camera device according to claim 1, wherein the rear cover has two second contact surfaces and a second noncontact surface, each of the second contact surfaces contacts the second end of the corresponding one of the thermal-conductive assembling elements, the second noncontact surface does not contact each of the thermal-conductive assembling elements, and a surface roughness of each of the second contact surfaces is less than a surface roughness of the second noncontact surface.

14. The camera device according to claim 1, wherein a thermal-conductive layer is further between the first end of each of the thermal-conductive assembling elements and the front thermal-conductive element or between the second end of each of the thermal-conductive assembling elements and the rear cover.

15. The camera device according to claim 1, wherein a thermal conductivity of the rear cover is greater than a thermal conductivity of the front cover.

16. The camera device according to claim 1, wherein the front thermal-conductive element comprises at least one elastic thermal-conductive member and an inelastic thermal-conductive member, one of two sides of the at least one elastic thermal-conductive member contacts the at least one heating element, the other side of the at least one elastic thermal-conductive member contacts the inelastic thermal-conductive member, and the inelastic thermal-conductive member contacts the two thermal-conductive assembling elements.

17. The camera device according to claim 1, wherein the at least one heating element comprises at least one first heating element and at least one second heating element, the at least one first heating element and the at least one second heating element are respectively at two opposite sides of the camera module, the front thermal-conductive element contacts the at least one first heating element, a contact portion between the front thermal-conductive element and the at least one first heating element has a first contact area, the front thermal-conductive element contacts the at least one second heating element, a contact portion between the front thermal-conductive element and the at least one second heating element has a second contact area, and the first contact area is equal to the second contact area.

* * * * *